Sept. 26, 1939.   A. F. WENTZELL   2,174,431
METHOD OF MAKING MECHANICAL PACKING
Filed May 4, 1937   2 Sheets-Sheet 1
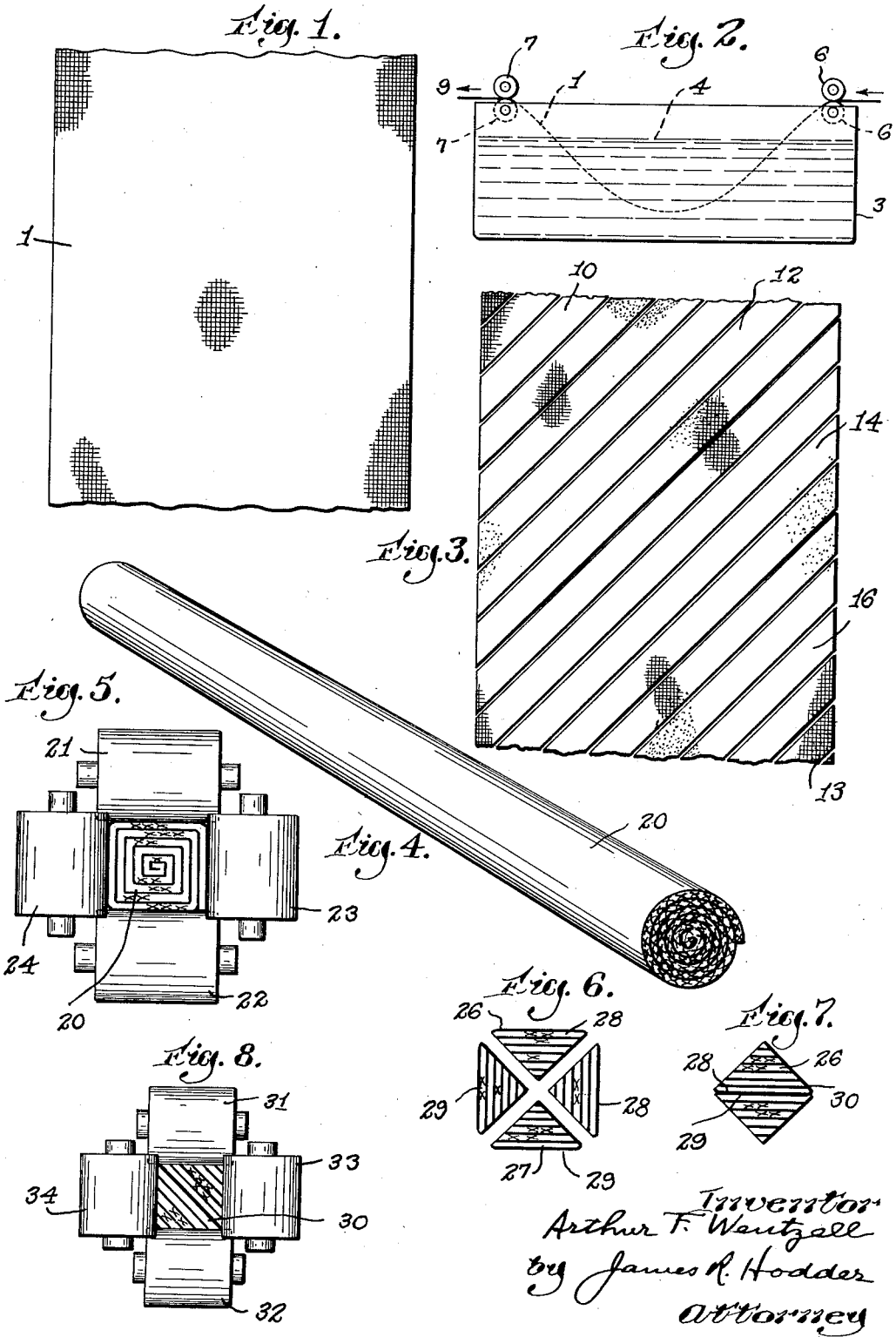

Sept. 26, 1939.　　　A. F. WENTZELL　　　2,174,431
METHOD OF MAKING MECHANICAL PACKING
Filed May 4, 1937　　　2 Sheets-Sheet 2
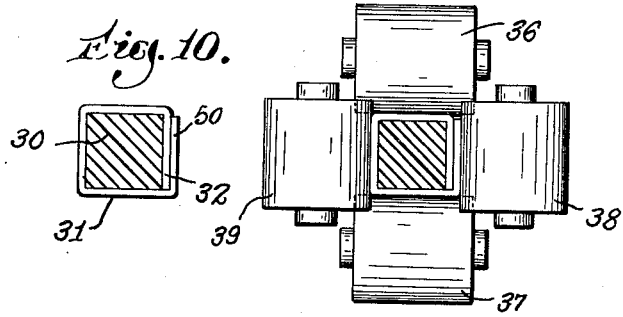
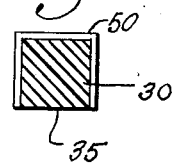
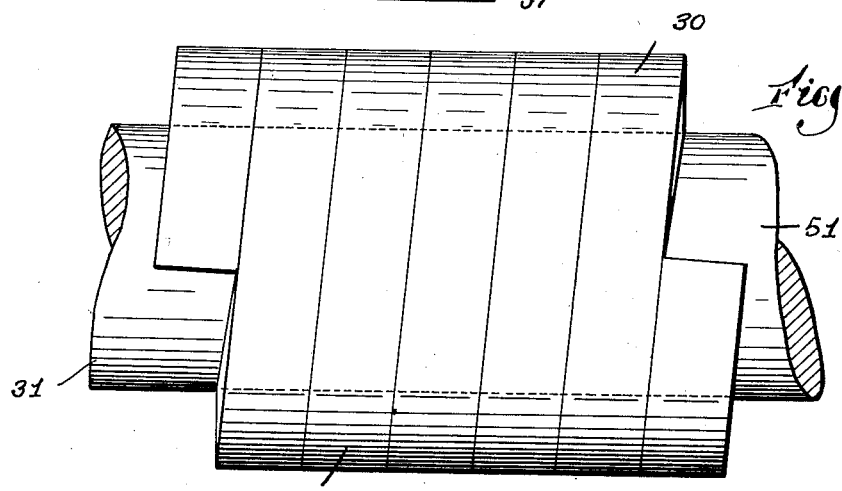
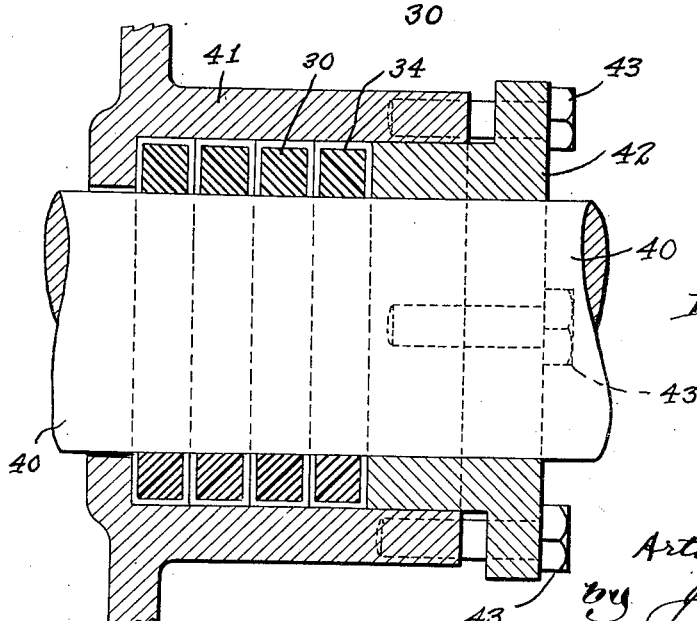
Inventor
Arthur F. Wentzell
by James R. Hodder
Attorney Patented Sept. 26, 1939

2,174,431

UNITED STATES PATENT OFFICE 2,174,431

METHOD OF MAKING MECHANICAL PACKING

Arthur F. Wentzell, Melrose, Mass., assignor to A. W. Chesterton Co., Inc., Boston, Mass., a corporation of Massachusetts Application May 4, 1937, Serial No. 140,672

4 Claims. (Cl. 154—2)

My present invention consists in a new and improved mechanical packing and includes a novel method of making the same.

My improved packing while suitable for general use for which the same may be constructed yet is particularly important in its capacity for use in extremely high pressure steam service where both heat and pressure of the highest degree in modern machinery are involved. The service to which mechanical packing is subjected, particularly where high pressure steam is involved, requires an unusually high capacity of compressibility, elasticity, wear-resistance, and heat resistance in order to maintain the tightness of the packing in steam pistons, valves, or the like service.

Heretofore, many efforts have been made to provide such packing material but the same were expensive in the methods of manufacture and unsatisfactory in use, involving uneven wear, lack of permanent elasticity, or other objectionable features.

My present invention is directed to improve and perfect mechanical packing, particularly such as is required in the present highest pressure steam service for which the packing is utilized.

In carrying out my invention I construct from suitable woven material packing cores with wear-resistant and heat-resistant qualities, and with a diagonal contacting surface made from such woven material, whereby great compressibility, permanent resilience, long life, and wear resistance is insured.

Further, my improved mechanical diagonal construction is made by a simple and efficient method, which utilizes to the greatest extent the diagonal construction and advantages incident thereto.

Thus in making my improved packing I utilize suitable woven material, preferably asbestos cloth or the like, treating the same by a heat-resistant solution which will also maintain and increase the resilience inherent in the cloth, and thereupon cut such material diagonally into strips. These strips are approximately at an angle of 45° with the weave of the material, and such strips may be joined end-to-end to form the same into a substantial length, constituting a blank or a core for subsequent manufacturing processes and cut into suitable lengths as desired.

The strips then made are interrolled, viz., rolling the same widthwise throughout the length of the strip formed, the solution with which the cloth was treated being also adhesive to hold the interrolled strip into this form as a core. Thereupon such a core is subjected to a pressing and, preferably, a squaring operation, and then the pressed and squared core is cut diagonally lengthwise into a plurality of triangular sections. Preferably, four of such sections may be conveniently and advantageously cut from such core, and thereupon two triangular sections are joined base-to-base to form two finished packing cores from the original blank or core. Thereupon each of these cores thus formed may be covered with cloth or material, such as the asbestos cloth from which the core itself is made, and thereupon the same vulcanized to unify and solidify the triangular sections into an integrated finished core.

With the cores as thus complete, they may be lubricated or coated with powdered graphite, or the like, and cut into suitable lengths, usually of standard dimensions to be subsequently formed into packing rings in a steam joint, valve, or the like service for which they are intended.

Other novel features and advantages will be hereinafter more fully pointed out and claimed.

Referring to the drawings illustrating a preferred embodiment of my invention carrying out the same by my novel method:

Fig. 1 is a diagrammatic plan view of a material or other woven fabric (such as asbestos) from which strips are cut to form my improved packing;

Fig. 2 is a diagrammatic view of treating such material with a resilient adhesive solution, coating both surfaces of the woven sheet;

Fig. 3 is a schematic view illustrating the cutting of the coated asbestos sheet into diagonal strips, which are placed end to end to make suitable lengths;

Fig. 4 is a perspective view illustrating a diagonally cut strip interrolled into a core;

Fig. 5 shows the core subjected to a squaring and pressing operation;

Fig. 6 is a view in cross-section showing the method of cutting the squared core diagonally into four equal triangular sections;

Fig. 7 is a cross-sectional view illustrating the assembling of any pair of cores cut as shown in Fig. 6 into a finished packing core of desired thickness;

Fig. 8 is a further pressing and squaring operation on the assembled sections of Fig. 7;

Fig. 9 illustrates a method of vulcanizing a finished packing core;

Fig. 10 is an end view showing an enclosing covering for the core thus made;

Fig. 11 is an end view showing a three-quarters covering;

Fig. 12 is a diagrammatic view showing further pressing and squaring of the covered blank, and Fig. 13 is a typical view partly in cross-section showing the service to which such high pressure packing is put in a gland with a rotating or reciprocating rod.

Referring to the drawings, Fig. 1 is illustrative of a typical sheet of woven asbestos, or other suitable fabric or woven material, designated generally at 1, which sheet is of relatively large area and which is subjected to a friction coating of a resilient and adhesive solution.

Any suitable method may be employed for such coating, but as herein illustrated in Fig. 2, I have shown in diagrammatic form a tank 3 containing a mass of the coating solution 4 thru which the sheet 1 is passed by fitting it between a pair of rollers at 6—6 at one end of the tank 3 and drawing same out thru a corresponding pair of feed rollers 7—7 at the opposite end, conducting the same in the direction of the arrows 9—9. With the sheet thus coated on both sides with the solution it is then dried sufficiently to be thereafter cut into diagonal strips, as shown in Fig. 3.

These strips, as herein illustrated, 10, 12, 14, and 16 are of suitable width for the subsequent size or diameter of the packing desired. The strips are also preferably cut so as to leave as little surplus material 13 as possible, and thereupon the strips thus cut from the sheet 1 may be joined end to end, reversing the bevel to provide for alignment and made into suitable length, which will be rolled upon itself to form twice the amount of material in diameter for the packing strip to be made therefrom.

Such strip thus made is thereupon interrolled upon itself, the resilient and adhesive solution forming the coating on the asbestos material, being sufficient also to hold the rolls into engagement with each other and to constitute a core 20 as illustrated in Fig. 4.

With the first core as thus formed, it is then put thru a pair of pressing and squaring rollers, as illustrated in Fig. 5, the core 20 being pliable, and with the adhesive solution uniting the same will be readily conformed into a squared blank substantially as shown in Fig. 5 when passed between opposite pairs of squaring rollers with suitable pressure, such for example as indicated diagrammatically, the top and bottom rollers 21 and 22 and side rollers 23 and 24 effecting a squaring action by any suitable operating means (not shown). With the blank thus squared it is then cut lengthwise diagonally into opposite pairs of long triangular strips 26 and 27, and 28 and 29, as indicated in Fig. 6.

Thereupon I select any two pairs, such for example as 26 and 27, and join them along their respective bases 28 and 29, thus forming two triangular strips into a square finished core 30. The adhesive solution coating the surfaces of the strip are sufficient to unite these blanks and hold them together during the subsequent operations. Two of such cores are thus made from each core 20, and the core 30 is thereupon subjected to a further pressing and squaring operation, as illustrated in Fig. 8, being run thru suitable pairs of rollers 31 and 32 at top and bottom, and 33 and 34 at each side, the cores being fed therethru as rapidly as desired and, thus, are solidified along their contacting bases 28 and 29, as will be readily appreciated. Thereafter, the core 30 is preferably covered either as shown in Fig. 10 or as shown in Fig. 11.

In the form shown in Fig. 10 I apply a covering layer which may also be of asbestos, or other woven fabric, entirely around the core 30 lengthwise of the same, allowing for the overlapping portion as indicated at 31 and 32, Fig. 10.

In Fig. 11 the covering 50 is around three-quarters of the core, leaving one edge 35 open, which will be that portion in contact with the moving member in the valve, it being appreciated that the covering 31 will wear off more quickly when in contact with the moving member in which the packing is compressed, and presenting the appearance of that shown in Fig. 11. The covered core 30 is thereupon subjected to a further pressing and squaring action, as shown in Fig. 12, between upper and lower rollers 36 and 37, and side rollers 38 and 39.

The packing core 30, as will be appreciated, is of suitable thickness, area, and length for the particular packing desired to be made, various lengths and diameters of the same being customarily kept in stock as standard sizes.

The packing is now subjected to a vulcanizing action, and as illustrated in Fig. 9, the packing core 30 may be wrapped around a hollow steam pipe 51 in the form of a mandril and subjected to the vulcanizing operation in order to cure the packing and thus cause the joined triangles and cover to become an integrated whole.

Any other method of vulcanizing the packing core 30 may be employed if desired, but that herein shown is particularly simple and efficient, and a large plurality of packing cores 30 may be assembled on the same mandril 51 for vulcanizing.

After the core 30 has thus been vulcanized it is removed from the mandril and preferably subjected to a soaking operation in a lubricating solution or bath, whereupon the packing may be drawn thru boxes of flaked or powdered graphite for further coating, and are thereupon packed for distribution to the trade.

In Fig. 13 I have illustrated a typical form of packing gland wherein the movable member 40, such as a steam piston or rotatable shaft, is subjected to the pressure-tight operation of the packing core 30 held within the stuffing box 41; and the gland 42 bears against the plurality of rings of packing 30 holding the same under compression against the movable member 40.

Slight pressure on the gland 42 causes packing 30 to contact rod 40 and render it fluid-tight. The diagonal construction of packing 30 renders the packing particularly sensitive and responsive to increased pressure, and greatly adds to its compressibility and flexibility.

It will be appreciated that by my novel method I have produced a wear-resistant packing with the diagonal feature constituting the actual contact and wear-resistant surface between the packing and the movable member 40, which thus greatly increases the wear-resistance and life of the packing as well as its efficiency in holding the joint pressure-tight even against the highest heat and pressure now demanded in high pressure steam service.

My novel and improved method of manufacture is particularly advantageous in providing an efficient method of making all sizes, lengths, and diameters of such packing, insuring the diagonal bearing feature of the packing on the movable member no matter how the packing is applied to the valve gland or steam joint.

I believe that my method of manufacture as well as the improved article of mechanical packing is distinctly new, and I wish to claim the same herein broadly.

I claim:

1. The improved method of manufacturing mechanical packing, which consists in first treating woven material from which the packing is to be made with an adhesive coating, cutting such cloth on the bias into strips, interrolling such strips into a core, suitable to form two packing strips, squaring said core, cutting said core lengthwise into four triangular sections, and thereafter uniting two sections lengthwise into a finished core of rectangular cross-section.

2. The improved method of manufacturing mechanical packing, which consists in first treating woven material from which the packing is to be made with an adhesive and vulcanizable coating, cutting such cloth on the bias into strips, interrolling such strips into a core, from which two finished cores may be formed, subjecting said core to a pressing and squaring operation, cutting said core lengthwise and cornerwise into four triangular sections, uniting two sections along the hypothenuse of each triangular section into a finished core of rectangular cross-section, and subjecting said united triangular sections to pressure and vulcanization.

3. The improved method of manufacturing mechanical packing which consists in treating woven material with a resilient, vulcanizable, adhesive coating, cutting said treated material on the bias into strips, uniting the strips end to end, interrolling such strips into a relatively long core, subjecting such core to a pressing and squaring operation, cutting the squared core lengthwise and cornerwise into a plurality of four right-angled triangular sections, uniting two such triangular sections along the hypothenuse of each together to constitute a finished core rectangular in cross-section, solidifying these united sections by a further pressing operation, and thereupon vulcanizing the core thus formed.

4. The improved method of making a mechanical packing of vulcanizable material with a wear-resistant surface formed of diagonally cut portions of fabric, which consists in cutting the fabric on the bias into strips, interrolling said strips widthwise into a relatively long core, subjecting the same to pressure to form the core substantially square in cross-section, severing said core lengthwise into four triangular quarter sections, by cutting the same from opposite corners, uniting two quarter sections into a substantially square core of substantially desired size for the finished core, subjecting the same to a further pressing and squaring operation, vulcanizing the core thus prepared, and thereafter covering the core with suitable fabric and treating with lubricant.

ARTHUR F. WENTZELL.